United States Patent

[11] 3,587,063

[72] Inventors Robert L. Lamberts; George C. Higgins, Rochester, N.Y.

[21] Appl. No. 871,728
[22] Filed Oct. 13, 1969
Division of Ser. No. 306,057, Sept. 3, 1963, Pat. No. 3,312,955, and a continuation of Ser. No. 601,796, Dec. 14, 1966, abandoned
[45] Patented June 22, 1971
[73] Assignee Eastman Kodak Company Rochester, N.Y.

[54] SYSTEM FOR RETRIEVING DIGITAL INFORMATION
6 Claims, 8 Drawing Figs.

[52] U.S. Cl. .......... 340/173, 235/61.11 C, 350/162 R
[51] Int. Cl. .......... G11c 13/04
[50] Field of Search .......... 235/61.11, 61.115; 340/173 LM; 350/162

[56] References Cited
UNITED STATES PATENTS
3,325,789 6/1967 Glenn .......... 340/173

*Primary Examiner*—Terrell W. Fears
*Attorneys*—W. H. J. Kline, Robert F. Crocker and Morton A. Polster

ABSTRACT: The high resolution of photographic film is used for information recording and retrieval by forming an image which can be accurately read out in spite of small pieces of dirt or scratches on the film. This is accomplished by exposing the film to a composite pattern which comprises a plurality of uniform gratings with different intervals, each representing the presence of a respective "bit" of an item of information. When the developed image of such a composite pattern is illuminated with monochromatic light, each of the first order spectra that is formed corresponds to a respective one of the uniform grating patterns. Since the composite pattern comprises the sum of the uniform gratings having different grating intervals, the presence or absence of a given first order spectrum can be used to represent the presence or absence of a corresponding binary bit.

ALL 1ST ORDER LINES LESS 70-130C/MM

ALL 1ST ORDER LINES LESS 120C/MM

ALL 1ST ORDER LINES LESS 90C/MM

ROBERT L. LAMBERTS
GEORGE C. HIGGINS
INVENTORS

BY Morton A. Polster

ATTORNEY

ROBERT L. LAMBERTS
GEORGE C. HIGGINS
INVENTORS

BY Morton A. Polster

ATTORNEY

SYSTEM FOR RETRIEVING DIGITAL INFORMATION

This is a division of application Ser. No. 306,057, filed Sept. 3, 1963, which issued on Apr. 4, 1967 as U.S. Pat. No. 3,312,955 and a continuation of Ser. No. 601,796 filed Dec. 14, 1966 and now abandoned.

The present invention relates to information storage and retrieval, and more particularly, to a method and apparatus for retrieving digital data stored on an information record in the form of a plurality of superimposed diffraction grating patterns.

In many modern applications of information storage and retrieval, an item of information is represented by a combination of a group of binary "bits." As is well known in the art, in digital information records using the binary system, the presence or absence of a bit indicates one or the other of the two ordinal values ("0" or "1") for each of a series of predetermined digit positions. Since most physical devices have two distinct states, for example, punched tape or card (hole or no hole), magnetic tape (magnetized or not magnetized area), relays (open or closed), photographic film (exposed or unexposed area), etc., these binary states can be used to indicate the presence or absence of one or more bits, thereby designating different items of information by different combinations of such binary conditions.

It is generally recognized that the theoretical amount of information that can be stored within a given area of photographic film is greater than for many other types of mediums because of the very high resolution available in photosensitive emulsions. However, in any system using photographic film for the storage of information, the amount of information that can be stored per unit area, commonly termed information packing or density, is many orders of magnitude below the theoretical limit. This limitation has arisen from the problem of locating a small area, either mechanically or optically, and because of the possibility of spurious signals being introduced due to dust, dirt and scratches on the film.

In conventional photographic data recording systems, the absence or presence of a small spot (exposed area) is used to indicate the ordinal value ("0" or "1") of each digit or "bit," each bit being positioned in a predetermined discrete area of the film record member. Therefore, each bit area must be separately scanned and monitored, and it must be large enough to minimize the possible loss or misreading of any particular information bit due to dirt or scratches appearing on the film surface. For this reason, accuracy is achieved in prior art photographic data recording systems by making the code area comparatively large, and since the relatively large area reserved for each particular bit of information could actually hold several more bits of recorded data, this is equivalent to using such smaller bit areas and repeating the same bit of information several times. Thus, in terms understood in the art, it can be said that such prior art systems achieve accuracy only by excessive redundancy. Also, when large code areas are used, the full resolution capabilities of the most photographic data recording systems, use is made of no more than a few lines per millimeter resolution, although certain films are capable of resolving over 1,000 lines per millimeter.

An important object of the invention is to provide a method and apparatus for reading out data recorded on a photosensitive medium which permits more information to be recorded per unit area and a maximum use to be made of the resolving power of the medium.

Another object of the invention is to use a composite pattern comprising a sum of individual grating patterns on a photographic film as a record of an item of information.

A further object of the invention is to read out a record which is in the form of a composite optical grating, by photoelectrically converting the angularly diverging beams of first order spectral lines derived from the grating into a group of electrical signals representing the information so recorded.

These and other objects and advantages of the invention will be apparent to those skilled in the art by the description which follows.

As is well known to those skilled in the art, when parallel monochromatic light passes through a diffraction grating and is focused by a lens onto a screen, a central bright image is formed together with bands of diffracted light (successive "-spectral orders") on either side of it separated by dark spaces. The smaller the grating interval (the more lines per unit length), the more divergent and sharply defined are the spectral orders. However, for any given light source, the spectral lines formed by one uniform grating of a particular spatial frequency are exactly similar to those formed by another grating of a different spatial frequency, except as to divergence, and so, with a monochromatic light source, the angle of the diverging beam from the grating for each spectral order increases as the grating interval decreases. Therefore, for any selected frequency of source light, the positions of the first order spectral lines formed by a plurality of different gratings will vary in accordance with their respective grating intervals.

In the present invention, use of the high resolution of photographic film for information recording and retrieval is made by forming an image which can be accurately read out in spite of small pieces of dirt or scratches on the film. This is accomplished by exposing the film to a composite pattern which comprises a plurality of uniform gratings with different intervals, each representing the presence of a respective "bit" of the item of information. When the developed image of such a composite pattern is illuminated with monochromatic light, each of the first order spectra that is formed corresponds to a respective one of the uniform grating patterns. Since the composite pattern comprises the sum of the uniform gratings having different grating intervals, the presence or absence of a given first order spectrum can be used to represent the presence or absence of a corresponding binary bit.

Reference is now made to the accompanying drawings wherein like reference numerals designate like parts and wherein.

Figure 3:
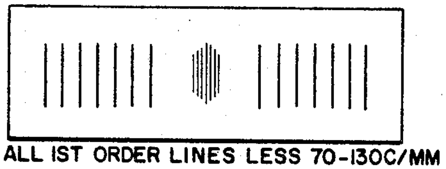
Figure 4:
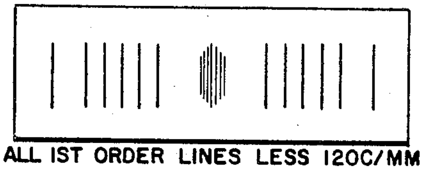
Figure 5:
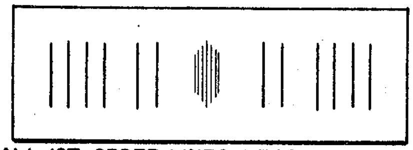
Figure 6:
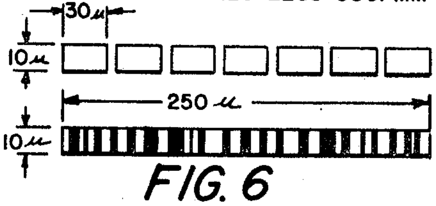
Figure 7:
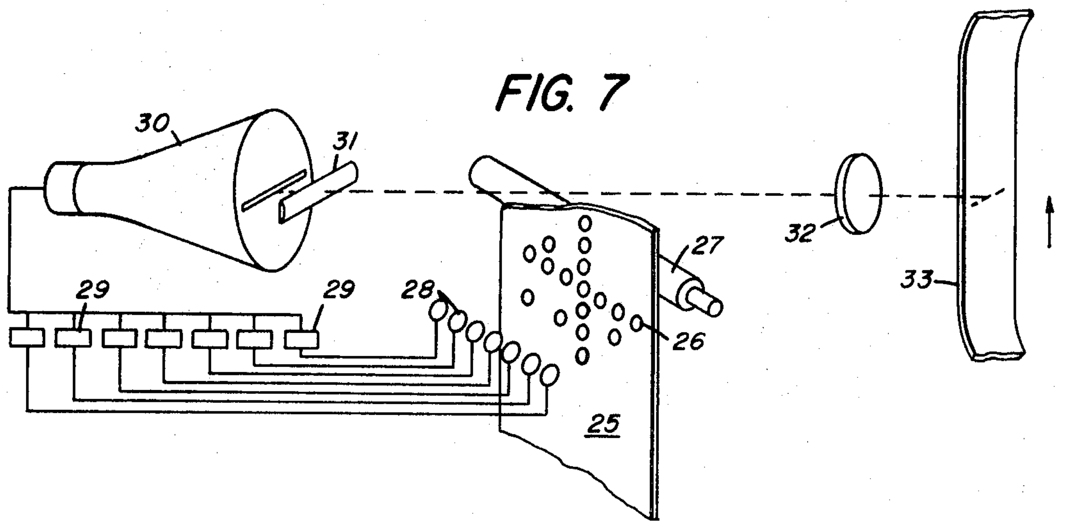
Figure 8:
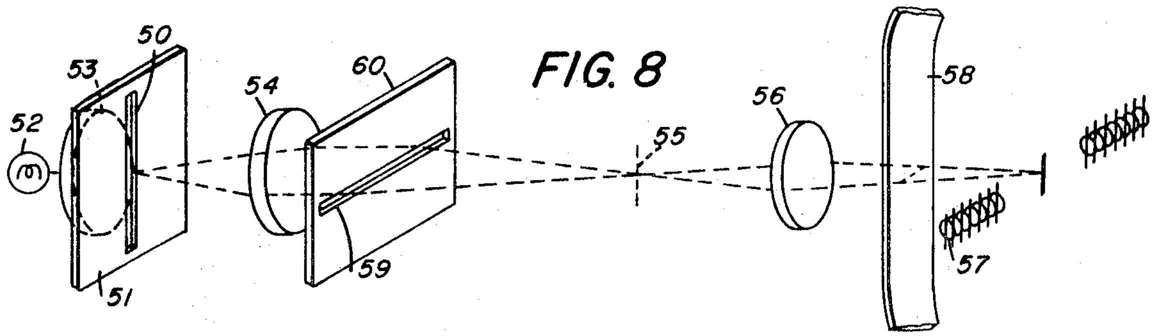

FIGS. 3—5 are representations of a single zero order spectral line and a group of first order spectral lines showing the relation of the first order spectral lines derived from photographic line gratings having different grating intervals;

FIG. 6 is a representation of the same item of information encoded on film, in the upper portion of the figure, in the form of discrete bits in accordance with prior art teachings, and in the lower portion of the figure, in accordance with the invention herein in the form of a composite pattern comprising a plurality of grating patterns, each having its own discrete periodic structure;

FIG. 7 is a perspective view of apparatus for recording an item of information on film as a composite pattern comprising a plurality of grating patterns;

FIG. 8 is a perspective view of apparatus for reading out information recorded on photographic film in the form of composite patterns of a plurality of superimposed diffraction gratings.

Figure 1:
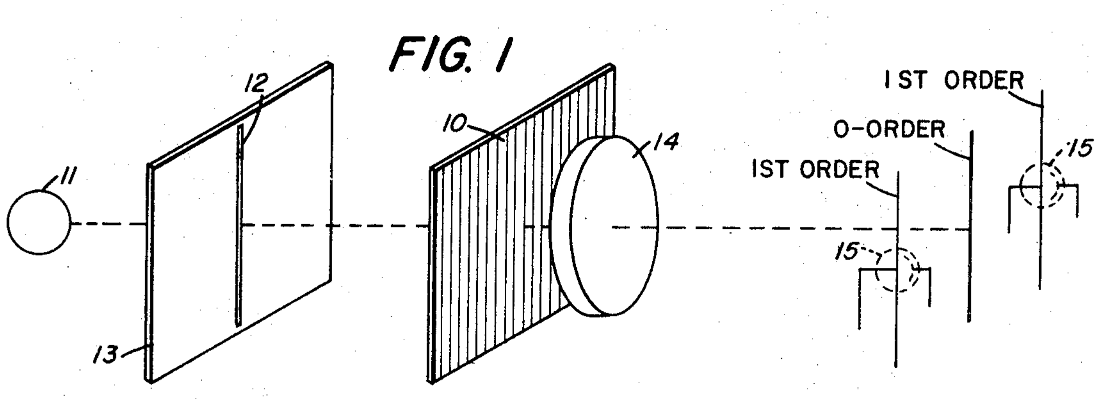
FIG. 1 is a schematic perspective view of an optical system in which a photographic line grating is used as a diffraction grating.

With particular reference to FIG. 1, a photographic line grating 10 can be used as a diffraction grating to provide a zero order spectral line and a first order spectral line. This is accomplished when a monochromatic light source 11 is used to illuminate a slit 12 in a mask or plate 13, the slit being imaged by means of a lens 14 coincident with the zero order line. The photographic grating 10 is placed at the lens aperture so that first and higher order spectral lines are formed alongside the slit image. By placing a photocell 15 in the position of either of the first order lines, it can be determined whether or not there is a particular grating pattern in the lens aperture.

Figure 2:
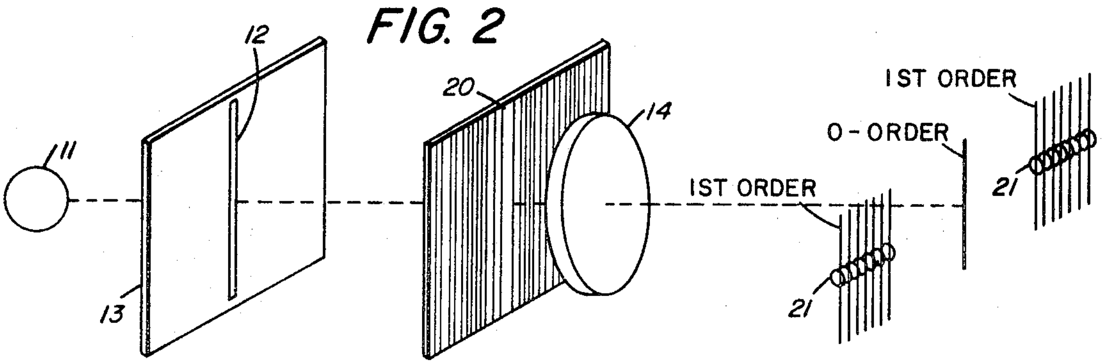
FIG. 2 is a schematic perspective view of an optical system in which a photographic line grating having spatially varying opacity is used as a composite diffraction grating.

A similar system is disclosed in FIG. 2 in which a composite photographic pattern 20 comprises a plurality of grating patterns, each having a unique, uniform grating interval. When the composite pattern 20 is positioned in the lens aperture, a number of first order spectral lines appear which correspond to the number of uniform grating patterns forming the composite pattern. As shown in FIG. 2, a group of photocells 21 can be arranged in the equivalent positions of the first order spectral lines to convert the number of spectral lines formed by pattern 20 into a corresponding number of electrical signals.

According to grating theory, the distance from the zero order spectral line, that is, the direct image, to any one of the first order spectral lines is inversely proportional to the grating interval of its respective grating pattern. If the ratio of the maximum to the minimum grating interval is less than two, the possibility of second order spectral lines falling in the same position as the first order spectral lines is eliminated. The second order spectral lines can also be eliminated by choosing a group of grating intervals such that the second order spectral lines transmitted thereby lie between the first order spectral lines of other grating intervals in the same group. However, the second order spectral lines are usually not of sufficient brightness to trigger a photocell so as to produce a spurious signal. The first order spectral lines are, therefore, indicative of the grating intervals that have actually been used to form the composite pattern.

In most instances where a binary-six code is used for representation of an item of information, an additional bit is usually recorded with each combination of digital bits as a timing mark. As a result, for this particular code arrangement a maximum of 7 bits or a minimum of 2 bits can be recorded in any one of a variety of combinations representative of a particular item of information. In FIGS. 3—5, as an example, gratings of 70, 80, 90, 100, 110, 120, and 130 cycles per millimeter are used, all of which are within an octave. Where the composite pattern comprises seven grating intervals to produce the above, assuming a binary-six code with a timing mark, seven first order spectral lines are formed, as shown in FIG. 3. In FIG. 4, the grating interval for producing the 120 cycle per millimeter line has not been recorded and similarly, in FIG. 5, the grating interval for producing the 90 cycle per millimeter line has not been recorded. Accordingly, any combination of the first order spectral lines can be obtained and are spaced in accordance with the combination of the grating intervals used to form the composite pattern.

In FIG. 6, the upper portion thereof shows the placement of clear and opaque code bits such as those which might appear as a digital numeral on one of the prior art photographic data records referred to above. Each particular bit occupies a discrete area of the film, and its presence or absence is indicative of the ordinal value (in a binary system: "0" or "1") for each ordered digit position of a six digit number (plus a seventh bit serving as a timing mark). Although, as noted above, such prior art data recording systems do not permit close packing of bits, the upper portion of FIG. 6 illustrates these prior art bits of a size which would be required if they were recorded (as is possible with present day photographic film) packing about one million ($10^6$) bits per square inch. Since the size of an individual bit is $10\mu$ high and $30\mu$ wide, and since it is necessary to monitor each individual bit, it can be seen that in order to obtain an accurate read out, any variation in film movement must be held to within a few microns, that is, within a few thousandths of a millimeter. The practical difficulty of guiding the film to such tolerances is easily understood. In addition, a scratch or piece of dirt less than one-thousandth of an inch wide can completely obliterate or change the reading of a bit.

The lower portion of FIG. 6 shows a corresponding 7-bit numeral stored at the same packing density ($10^6$ bits per sq. inch) and recorded as a composite grating according to the invention herein. Since the grating extends throughout the entire discrete area allotted to the numeral, and since only a relatively small portion of the overall width of this composite grating is necessary to produce all of the first order spectral lines referred to above, it can be seen that tolerances for film movement are increased greatly. For the same reason, a scratch or piece of dirt covering even a substantial portion of the composite grating will not obliterate or alter the information, since all of the first order spectral lines will still be formed by the remaining portions of the grating.

It should be understood that the information readout method and apparatus claimed herein may be incorporated in a data storage and retrieval system which includes apparatus for initially recording data on an information storage medium in the form of the above-described composite patterns of superimposed diffraction gratings. To facilitate appreciation of the invention herein, reference is now made to an embodiment of such recording apparatus schematically illustrated in FIG. 7. A tape 25, which is perforated with a combination of aperture 26 arranged transversely thereof and representative of an item of information, is moved past a light source 27 and a group of photocells 28. Each of the apertures 26 in a transverse group will transmit light to a corresponding photocell 28 which, in turn, will gate its corresponding oscillator circuit 29 to which the photocell is connected. Each of oscillators 29 provides a series of output signals of a different predetermined frequency. The group of frequencies provided by oscillators 29 can be chosen without regard to second order spectral lines or can be chosen to be within an octave so as to eliminate second order lines as described above. The oscillators are connected to a cathode-ray tube 30 so that the intensity of its beam is modulated by the frequency signals derived from the oscillators.

As is well known, information can be presented on the screen of a cathode-ray tube by varying the density of the electron beam, which produces a change in the intensity of the spot of light on the face of the tube. If the intensity is made to change in accordance with some intelligence, the result is intensity modulation. Such modulation can be used to produce a series of equally spaced bright spots on the face of the tube which are indicative of equal periods of time. This can be accomplished by applying a cyclically repetitive signal to the cathode-ray tube in such a way that the intensity of the trace is increased at regular intervals.

Since the oscillators 29 provide a combination of different frequencies in accordance with those that have been gated, the trace on the face of the tube 30 is a series of bright spots representative of the algebraic sum of the frequencies produced by the gated oscillators. A cylindrical lens 31 is optically aligned with the trace on the face of tube 30 for converting the series of spots to a pattern of lines which, in effect, is a composite grating pattern that is imaged by a lens 32 on a photosensitive medium, such as film strip 33. Depending on the size of the film used and the size of the image pattern, the filmstrip 33 can be moved continuously or intermittently in a longitudinal direction in accordance with the size of the pattern, or an optical system can be used which will display a number of such line patterns successively across the movement of the film. In addition to the system just described, the filmstrip 33 can be positioned within the cathode-ray tube 30 and exposed directly by the electron beam.

When the film is developed, the resulting image is a composite pattern of spatially varying opacity comprising a plurality of grating patterns, each pattern having a unique, uniform grating interval in accordance with the frequency of its respective oscillator. Such a composite grating pattern is illustrated in the lower portion of FIG. 6. It should be obvious to those skilled in the art that oscillators 29 can also be gated by signals derived from information encoded on a magnetic tape, photographic film, punched cards, etc., or by signals derived from a computer or any other signal producing means. If the item of information on the medium from which the signals are derived for rating the oscillators is not compatible with the oscillator frequencies, a matrix circuit can be used to convert such signals to a combination usable by the oscillators.

Data recorded on a storage medium in the form of the above-described composite patterns of superimposed diffraction gratings may be read out by the novel method disclosed herein, and apparatus for reading-out information in accordance with this method is illustrated in FIG. 8. In the present state of the art, the simplest devices for testing for the presence or absence of first order spectral lines derived from such superimposed grating patterns are photocells positioned as described above and shown in FIGS. 1 and 2. However, for small code areas, it is necessary to provide an optical system for illuminating only one of the composite patterns on the film at a time. The system shown in FIG. 8 comprises a slit 50 in a mask or plate 51 which is illuminated by a high-pressure mercury lamp 52 or other substantially monochromatic light source, the light being projected onto the slit 50 by a lens 53. The slit is then imaged by a lens 54 to form a real image 55 in space and this image is then projected by a lens 56 through an encoded filmstrip 58 and onto a group of photocells 57 positioned in the focal plane of lens 56. The lens 56 also images a slit 59 in a mask or plate 60 onto film 58 so that the area actually illuminated is a reduced image of the slit 50 and corresponds to the area on the film that is to be decoded. Since the real image 55 cooperates with slit 59 to provide a small source of illumination in the conjugate focal plane of lens 56, a coherent system of illumination for the grating on film 58 is effectively formed.

When this effectively coherent light is passed through the composite patterns of superimposed diffraction gratings recorded on film 58, a bright (O-order) image of the light source is formed on the central axis of the light system, and first order spectral beams are formed on individual axes angularly spread from this central axis. Since, as described above, for any given frequency of source light and known grating interval, the angular divergence of the first order spectral beams can be accurately determined, photocells 57 may be positioned to monitor the presence or absence of any one of the preselected grating patterns superimposed in the composite pattern being monitored. It should also be noted that a cylindrical lens, not shown, may be placed behind the film to concentrate the light along the length of the first order lines thereby collecting it more effectively onto the photocells.

It has been found that an item of information can be stored as a composite pattern comprising the sum of a plurality of grating patterns that are exposed onto a high quality film, each pattern having a unique, uniform grating interval and being individual to one of the bits in the digital data representative of the item of information. To read the item of information so recorded on a photographic film, the composite pattern is used as a diffraction grating to form a number of first order spectral lines which correspond to a particular combination of bits representative of the item of information recorded. This system has the advantage that, while data may be recorded on photosensitive storage media at very high packing densities, the image corresponding to an item of information can be read out accurately and is not destroyed or changed by small pieces of dirt or scratches on the film. Furthermore, since the grating patterns are superimposed, the area occupied by a single item of information is larger than for conventional recording of a single bit. As a result, the problem of locating an area on the film is very much simplified by the system described hereinabove. In certain applications, advantage can be taken of coherent illumination and copies of such a composite pattern can be made by this means with very little loss in image quality.

While the invention has been described with respect to only one particular embodiment for retrieving information recorded in the form of a plurality of superimposed diffraction gratings, it is to be understood that various changes can be made in the disclosed apparatus by those skilled in the art without departing from the spirit of the invention.

We claim:

1. The method of analyzing which of a predetermined plurality of optical gratings of individually different, predetermined uniform spatial frequency, effectively superimposed upon one another to conjointly form a composite grating representative of an item of information recorded on a record medium, are actually present in a given composite grating, comprising:

illuminating an aperture with a beam of substantially monochromatic light and forming a real image of said aperture;

projecting the real image of said aperture along a path and into a predetermined plane;

positioning said record medium in said path and in spaced relation to said plane with said composite grating intercepting the projected real image for producing in a predetermined plurality of locations in said plane a number of spaced, discrete, diffraction light images of a given order in accordance with the number of different optical gratings forming said given composite grating, each of said locations corresponding to a position in which a respective one of said predetermined plurality of optical gratings will form a diffraction light image; and examining each of said locations to determine the presence of a diffraction light image therein.

2. The method of detecting multibit digital data recorded on a record medium as a composite diffraction grating comprising a plurality of component gratings effectively superimposed upon one another, each of said component gratings corresponding to a different individual bit of said data and having a predetermined spatial frequency uniquely indicative of that particular bit, the spatial frequencies of all of said component gratings being selected from a predetermined group of discrete spatial frequencies, comprising:

directing a beam of substantially monochromatic light along a path toward an image plane;

positioning said record medium in said path and in spaced relation to said plane so said composite diffraction grating will be illuminated by said beam of light for producing in said plane a number of discrete, diffraction light images equivalent to the number of optical gratings comprising said composite diffraction grating and spaced in accordance with the spatial frequency of each respective optical grating; and examining each position in said plane in which a diffraction light image will be produced when said composite diffraction grating comprises said plurality of component gratings to detect the individual bits representative of the digital data recorded as said composite diffraction grating.

3. The method in accordance with claim 2 including the step of:

generating an electrical signal in response to and representative of each diffraction light image detected in said plane.

4. Apparatus for reading out multibit digital data recorded on a record medium as a composite diffraction grating comprising a plurality of component gratings superimposed upon one another, each of said gratings corresponding to a different individual bit of said data and having a spatial frequency uniquely indicative of that particular bit, the spatial frequencies of all of said component gratings being selected from a predetermined group of discrete frequencies; said apparatus comprising:

a source of light arranged in spaced relation to an image plane;

means for positioning said record medium intermediate said source of light and said plane;

means for directing said source of light onto said composite diffraction grating for producing in said plane a plurality of spaced, discrete, diffraction light images equivalent in number to the component gratings comprising said composite grating.

a plurality of light-responsive elements equivalent in number to the selected spatial frequencies, each of said elements being positioned in said plane so as to be responsive to a respective one of the diffraction light images formed by said component gratings, thereby indicating the multibit digital data recorded by said composite grating.

5. Apparatus as in claim 4 wherein the light directed from said source of light onto said composite diffraction grating is substantially monochromatic.

6. Apparatus for reading out multibit digital data recorded on a record medium as a composite diffraction grating comprising a plurality of component gratings effectively superimposed upon one another, each of said component gratings corresponding to a different individual bit of said data and having a predetermined spatial frequency uniquely indicative of that particular bit, the spatial frequencies of all of said component gratings being selected from a predetermined group of discrete spatial frequencies; said apparatus comprising:

means for producing a monochromatic beam of light;

means for directing said beam of light along a path to an image plane;

means for positioning said record medium in said path and in spaced relation to said plane so said composite grating is illuminated by said beam of light for producing in said plane a number of spaced, discrete, diffraction light images equivalent in number to the component gratings comprising said composite grating; and a plurality of light-responsive elements equivalent in number to the selected spatial frequencies, each of said elements being arranged in said plane so as to be responsive only to the diffraction light image formed by its respective component grating when present in said composite grating.